United States Patent [19]

Sawa et al.

[11] 3,748,560

[45] July 24, 1973

[54] DEVICE INCLUDING THYRISTOR CHOPPER FOR CONTROLLING INDUCTIVE LOAD

[75] Inventors: Kunihiko Sawa; Shigenori Kinoshita; Masahiro Kaimoto, all of Kawasaki-shi, Japan

[73] Assignee: Fuji Denki Seizo Kabushiki Kaisha, Kawasaki-shi, Japan

[22] Filed: July 14, 1972

[21] Appl. No.: 271,728

[30] Foreign Application Priority Data
July 14, 1971 Japan................................ 46/52327
July 4, 1971 Japan................................ 46/52328

[52] U.S. Cl.................. 318/430, 318/341, 318/376, 321/45 C
[51] Int. Cl. .......................................... H02p 3/14
[58] Field of Search.................... 318/341, 430, 376; 321/45 C

[56] References Cited
UNITED STATES PATENTS

| | | | |
|---|---|---|---|
| 3,544,873 | 12/1970 | Gunsser et al. | 318/376 |
| 3,619,753 | 11/1971 | Thompson | 321/45 C X |
| 3,667,021 | 5/1972 | Anderson et al. | 321/45 C X |
| 3,697,845 | 10/1972 | Soffer | 321/45 C X |

Primary Examiner—B. Dobeck
Attorney—John C. Holman, Marvin R. Stern et al.

[57] ABSTRACT

A control device including a thyristor chopper for controlling an inductive load such as a d.c. motor comprises a chopper including a main thyristor and means for extingushing the main thyristor, the chopper being connected in series or in parallel to a d.c. power source, a free-wheeling diode or a normal current blocking diode, either of which is of a polarity opposite to that of the d.c. power source and is connected in parallel or in series to the inductive load, and an auxiliary circuit comprising a resistor and a second thyristor connected in series and further connected in parallel to the freewheeling diode or normal current blocking diode, the second thyristor having a polarity reverse to that of the diode, and receiving, at least in the starting period of the controlling operation, an ignition pulse in synchronism with the ignition pulse applied to the main thyristor, and the resistance value of the resistor being so selected that the current flowing through the main thyristor is greater than a latching current of the main thyristor.

3 Claims, 3 Drawing Figures

DEVICE INCLUDING THYRISTOR CHOPPER FOR CONTROLLING INDUCTIVE LOAD

BACKGROUND OF THE INVENTION

This invention relates to control devices of the type including a chopper, and more particularly to a type thereof including a thyristor chopper and intended to control an inductive load such as a d.c. motor, the power thereof being supplied from a d.c. power source.

A thyristor chopper generally includes a main thyristor for conducting the load current and a commutating circuit comprising a commutation capacitor, a commutation reactor, and an auxiliary thyristor for extinguishing the main thyristor. "ON" operation of the thyristor chopper is obtained by igniting the main thyristor, and "OFF" operation of the thyristor chopper is obtained by igniting the auxiliary thyristor to extinguish the main thyristor.

By the above described "ON-OFF" control of the thyristor chopper the d.c. power supplied from a d.c. power source to a d.c. load can be controlled. In this case, a free-wheeling diode may be connected in parallel with the d.c. load, with the polarity of the diode being reversed relative to that of the main thyristor, so that a part of the load current may be maintained by the energy stored in the inductive d.c. load even in the "OFF" time of the thyristor chopper. If necessary, smoothing reactor may be connected in series to the d.c. load thereby to reduce the ripples contained in the load current.

In the above described organization of the conventional control devices of the type including a thyristor chopper, the load current through the inductive load cannot be established in the main thyristor in some cases even if "ON" commanding signals are applied to the gate of the main thyristor in the chopper. One reason for this is that, because of a relation between the circuit voltage, time constants determined by the inductance and resistance values of the circuit, and the duration period of the ignition pulses, the load current cannot be increased in excess of the latching current of the main thyristor while the ignition pulses are existing at the gate of the main thyristor. When the load current fails to exceed the latching current of the thyristor, the main thyristor becomes conductive temporarily while the ignition pulse exists at the gate of the main thyristor, but the conducting state cannot be maintained after the termination of the ignition pulse, whereby the blocking nature of the main thyristor is recovered.

To eliminate the above described disadvantage of the conventional control devices for an inductive load, such as a d.c. motor, a resistor may be connected in parallel to the d.c. load to provide a current flowing through the main thyristor immediately after the application of the ignition pulses to such an extent that the current exceeds the latching current value of the main thyristor, so that the chopper is maintained in the "ON" state even after the termination of the gate pulses applied to the main thyristor until the load current rises in accordance with the time constant determined by the circuit elements as described above.

However, such provision of a resistor connected in parallel to the inductive load causes further drawbacks such as an increase in the power consumption in the control circuit because of the flow of a current through the resistor not only during the "ON" time thereof but during the "OFF" time of the control circuit and an increase in the size and weight of the control devices because of the existence of such a resistor.

Furthermore, when the d.c. inductive load is in the form of a d.c. motor, the same ignition difficulty also arises in the transfer of the operation of the d.c. motor from the normal running state to a regenerative braking operation. More specifically, when the regenerative braking operation of the d.c. motor is required, the d.c. motor is switched, by means of a suitable device, to be connected to a d.c. power source through a reverse current blocking diode, and the above-mentioned chopper is connected in parallel to the d.c. motor. After the switching of the control circuit, the chopper is operated in the "ON" state to short circuit the d.c. motor for initiating the establishment of the d.c. voltage in the d.c. motor now acting as a generator for regenerating power to the d.c. source. At this instant, because of the inductance in the load circuit of the main thyristor in the chopper, the load current passing through the main thyristor cannot be increased in excess of the latching current value of the main thyristor within the duration period of the ignition pulses applied to the gate of the main thyristor, whereby the main thyristor tends to fail in igniting, and a d.c. voltage cannot be established in the d.c. motor.

SUMMARY OF THE INVENTION

A primary object of the present invention is to provide a control device including a thyristor chopper, wherein an auxiliary circuit of a simple construction and light weight is provided thereby to assure building-up of a current in the thyristor chopper at its starting period.

Another object of the invention is to provide a control device including a thyristor chopper, wherein an auxiliary circuit of the above-mentioned features is provided thereby to assure the establishment of a current in both of the operational modes of the control device, one mode for supplying power from the d.c. power source to the inductive load, and the other mode for regenerating power from the inductive load to the power source.

These and other objects of the present invention can be achieved by a control device including a thyristor chopper and operable to control an inductive load, which, in one aspect of the invention, comprises: a chopper, including a main thyristor and means for extinguishing the main thyristor connected in series to the inductive load and also to a d.c. power source; a free-wheeling diode connected in parallel with said inductive load; and an auxiliary circuit consisting of a resistor and a second thyristor connected in series and further connected in parallel to the free-wheeling diode, the second thyristor having a polarity reverse to that of the free-wheeling diode and receiving, at least in the starting period, an ignition pulse in synchronism with the ignition pulse applied to the main thyristor, and the resistance value of the resistor being so selected that the current flowing from the d.c. power source to the resistor through the main thyristor and the second thyristor is greater than the latching current value of the main thyristor.

In a second aspect of the invention, the device for controlling an inductive load, which is in this embodiment a d.c. motor, in a regenerative mode of operation comprises: a chopper, including a main thyristor and means for extinguishing the main thyristor, connected in parallel with the d.c. motor; a normal current blocking diode connected in series to the d.c. power source; and an auxiliary circuit consisting of a resistor and a second thyristor connected in series and further connected in parallel to the normal current blocking diode, the second thyristor having a polarity reverse to that of the diode and receiving, at least in the starting period of the regenerative mode of operation, an ignition pulse in synchronism with the ignition pulse applied to the main thyristor, the resistance value of the resistor being so selected that the current flowing from the d.c. power source to the resistor through the main thyristor and the second thyristor is greater than the latching current value of the main thyristor.

In a third aspect of the invention, the device for controlling an inductive load, which is a d.c. motor in this embodiment, further comprises switching means for switching the chopper and the auxiliary circuit, commonly provided in the control circuit, in both ways as described in the first and the second aspects of the invention, so that the d.c. motor is made operable in both the normal running mode and the regenerative braking mode.

The nature, principle, and the utility of the present invention will be more clearly understood from the following detailed description of the invention when read in conjunction with the accompanying drawing, in which like parts are designated by like reference numerals.

DETAILED DESCRIPTION OF THE INVENTION

Figure 1:
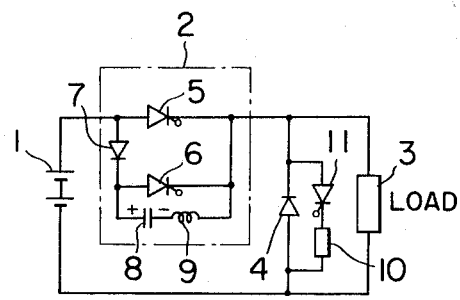
FIG. 1 is a simplified circuit diagram of one example of the control device according to the present invention, wherein an auxiliary circuit is connected in parallel with a free-wheeling diode thereby to assure the establishment of a current through the control device.

Referring to FIG. 1 showing a control device constituting the first embodiment of the present invention, there is indicated an inductive load 3 connected through a chopper 2 to a d.c. power source 1. The chopper 2 is of a well known organization including a main thyristor 5, an auxiliary thyristor 6, a commutating diode 7, a commutating capacitor 8, and a commutating reactor 9. An auxiliary circuit, in itself comprising a resistor 10 and a second thyristor 11 connected in series, is connected in parallel with a free-wheeling diode 4 of a polarity reverse to that of the d.c. power source 1 connected across the inductive load 3. The resistance value of the resistor 10 is so selected that a current flowing from the d.c. power source 1 through the main thyristor 5 and the second thyristor 11 to the resistor 10 exceeds a latching current value of the main thyristor 5.

Before the starting of the chopper 2, the commutating capacitor 8 is charged to the indicated polarity through a closed circuit as follows: d.c. power source 1 → diode 7 → capacitor 8 → reactor 9 → load 3 → d.c. power source 1, and the discharge of the capacitor 8 is blocked by the diode 7. If, with the circuit in this condition, an "ON" commanding signal, that is, an ignition pulse, is supplied to the chopper 1 from another control device (not shown), a current starts flowing from the d.c. power source 1 to the inductive load 3 through the main thyristor 5. Simultaneously with the application of the ignition pulse to the gate of the main thyristor 5, an ignition pulse is also applied to the gate of the second thyristor 11 from the control device (not shown). This causes a current to flow through the main thyristor 5 to the resistor 10 and the second thyristor 11 connected in series.

Since the value of this current is selected to be more than the latching current of the main thyristor 5, the total current flowing through the main thyristor 5 amply exceeds the latching current value of the main thyristor 5 even if the load current passing through the load 3 is still low because of the inductance of the load 3. As a result, the current in the main thyristor can be maintained even after the termination of the ignition pulse until the load current rises to its normal value.

At an instant when the load current rises to a predetermined value or when a predetermined time has passed from the establishment of the current, an "OFF" signal is applied to the chopper 2. In other words, an ignition pulse is applied to the auxiliary thyristor 6. The ignition of the auxiliary thyristor 6 provides an inverted charging circuit passing through the thyristor 6 and the reactor 9, whereby the commutating capacitor 8 is charged with reversed polarity. After the attainment of the reversed polarity, the main thyristor 5 and the auxiliary thyristor 6 are extinguished, and the load current so far flowing through the main thyristor 5 is shifted to the commutation circuit comprising the commutating capacitor 8 and the commutating reactor 9. The commutating capacitor 8 is thereby charged again with the original polarity as indicated in FIG. 1.

When the load current passing through the commutating circuit starts to decrease from a maximum value, a part of the load current flowing through the inductive load is passed through the free-wheeling diode 4. Under this circuit condition, the chopper 2 is maintained in "OFF" state, and the commutating capacitor 8 is prepared for the subsequent operation of the chopper. When the load current is commutated to the free-wheeling diode 4, a reverse voltage is applied to the thyristor 11, whereby the thyristor 11 is extinguished. As a result, the resistor 10 is automatically cut-off from the circuit, and the power loss due to the resistor 10 is accordingly reduced, heat generation thereby decreasing.

Upon application of an "ON" signal to the chopper, that is, when the main thyristor 5 is ignited, the load current is commutated from the free-wheeling diode 4 to the main thyristor 5. The above described operations are thereafter repeated for obtaining a required control of the inductive load. However, the thyristor 11 is not required to be ignited after the load current has reached a sufficiently large value.

According to the present invention, since the resistor 10 is connected to the circuit through the thyristor 11 only while the chopper 2 is started, the resistor 10 can be of a comparatively small capacity, and likewise, the thyristor 11 may also be of an extremely small capacity. Furthermore, there is no necessity of providing any extinction means for the thyristor 11. For these reasons, increases in size and weight of the control device can be substantially avoided, while the establishment of the current in the chopper circuit can be assured.

Figure 2:
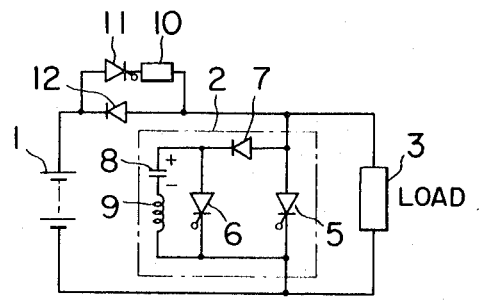
FIG. 2 is a simplified circuit diagram of one example of the control device in accordance with the second aspect of the invention, wherein for the purpose of obtaining a regenerative braking operation, an auxiliary circuit is connected in parallel with a normal current blocking diode connected in series to a d.c. power source, whereby the establishment of a current passing through the control device is assured.

Referring now to FIG. 2 showing the second embodiment of the present invention, wherein like or similar parts are designated by like reference numerals, the inductive load 3 indicated in FIG. 1 is in this example assumed to be a d.c. motor having a series-wound field circuit.

In order to obtain a regenerative braking operation of the d.c. motor, a normal current blocking diode 12 is provided in series with a d.c. power source 1. At the start of the regenerative braking operation of the d.c. motor 3, an "ON" signal is applied to the chopper 2, that is, an ignition pulse is applied to the gate of the main thyristor 5. As a result, the chopper 2 conducts, short-circuiting the d.c. motor 3, and, because of the existence of residual magnetism in the series-field (not shown) of the d.c. motor, a weak current starts to flow through the d.c. motor and the main thyristor 5. The flow of the weak current strengthening the magnetization of the series field gives rise to an increase in the voltage induced in the d.c. motor 3 to establish the regenerative voltage. However, if the inductance in the motor circuit is excessively great, the establishment of the current flowing therethrough will be retarded, thus failing to exceed the latching value of the main thyristor 5 while the ignition pulse applied thereto is still existing. When the occurs, the main thyristor which was once conductive will recover its blocking ability in its forward direction, whereby the current flowing through the main thyristor 5 will be interrupted.

According to the present invention, a resistor 10 is further provided in parallel to the normal current blocking diode 12, and a second thyristor 11 having a polarity reverse to that of the diode 12 is connected in series to the resistor 10. A provision is also made for igniting the second thyristor 11 simultaneously with the ignition of the main thyristor 5. Thus, when the main thyristor 5 conducts, the second thyristor 11 is also ignited in the case where the conduction of the main thyristor 5 is in an initial part of the period of the operation as will be described in greater detail hereinafter. The conduction of the second thyristor 11 causes a current substantially equal to the latching current of the main thyristor 5 to flow through the resistor 10, second thyristor 11, and the main thyristor 5, whereby the total current flowing through the main thyristor 5 amply exceeds the latching current value of the main thyristor 5. As a result, the conduction of the main thyristor 5 is maintained even after the termination of the ignition pulse applied to the gate of the main thyristor 5, and the establishment of the current through the control device is assured.

When the current flowing through the d.c. motor rises to a predetermined maximum value, an "OFF" signal is applied to the chopper 2, that is, an ignition pulse is applied to the gate of the auxiliary thyristor 6. As a result, a commutation procedure is carried out as described with reference to FIG. 1, and the chopper 2 is brought into the "OFF" condition. The "OFF" operation of the chopper 2 causes the motor current to flow through the diode 12 to the d.c. power source 1, whereby the regenerative braking operation of the d.c. motor can be obtained.

In the case where the regenerative current drops in excess of a predetermined value, the main thyristor 5 is again ignited, thus increasing the motor current to the above-mentioned maximum value of the motor current. Upon the attainment of the maximum value, the chopper 2 is again brought into the "OFF" condition, and the regenerative current is supplied to the d.c. power source. These steps are repeated until the speed of the d.c. motor is decreased to a desired value. From the second step of the above described operation, the application of the ignition pulse to the gate of the second thyristor 11 can be omitted without incurring a failure of establishment of the motor current because the current through the inductive d.c. motor has reached a value sufficiently greater than the latching current.

Figure 3:
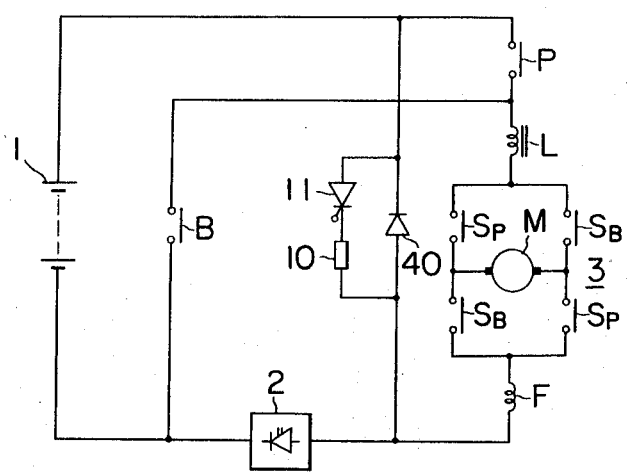
FIG. 3 is a simplified circuit diagram of the control device in accordance with the third aspect of the invention, wherein an auxiliary circuit is commonly provided for assuring the establishment of a current through the control device at the starting time of the normal running mode and the regenerative braking mode of operation of a d.c. motor.

Referring now to FIG. 3 showing a third embodiment of the present invention, wherein like parts are also designated by like reference numerals, there are indicated an armature M, a series field winding F, and a smoothing reactor L, which in combination constitute the inductive load indicated in FIG. 1. The armature M is connected to two pairs of switches Sp and Sb, whereby the polarity thereof is made changeable. The entire load circuit 3 can be connected to a d.c. power source 1 through another switch P and a chopper 2. Furthermore, the series connected load circuit 3 and the chopper 2 can be short-circuited by still another switch B. A diode 40, which can act as the free-wheeling diode 4 in the circuit shown in FIG. 1 and also as the normal current blocking diode 12 in the circuit shown in FIG. 2, is connected in parallel to the series connected switch P and the load circuit 3. A second thyristor 11 and a resistor 10 connected in series are further connected in parallel to the diode 40.

When the d.c. motor is started in its normal operation, the switch P and a pair of switches, for instance, Sp for connecting the armature M into a desired polarity are closed, while the other pair of switches Sb and the switch B are left open. With this connection, the circuit corresponds to the circuit shown in FIG. 1. The voltage supplied from the d.c. power source to the motor circuit 3 is thereby regulated by the "ON-OFF" operation of the chopper 2, and while the load circuit 3 is thus controlled, an ignition pulse is applied to the second thyristor 11 simultaneous at least with the first "ON" signal applied to the chopper 2.

When the motor is operated in a regenerative braking mode, the chopper 2 is kept in the "OFF" state thereby to attenuate the motor current through the free-wheeling diode 40. Then the switches P and Sp are opened, and other switches Sb and B are closed. The circuit connected in such a manner corresponds to that shown in FIG. 2. With this connection, the control device can be operated in its regenerative braking mode as described before, and the diode 40 acts to block normally directed current throughout the operation.

As will be apparent from the above description, the control device according to the present invention can assure the buildup of the load current in the chopper

We claim:

1. A control device including a thyristor chopper for controlling an inductive load, comprising a chopper including a main thyristor and means for extingushing the main thyristor and connected with series to the inductive load and also to a d.c. power source, a free-wheeling diode connected in parallel with said inductive load, and an auxiliary circuit comprising a resistor and a second thyristor connected in series and further connected in parallel with said free-wheeling diode, said second thyristor having a polarity reverse to that of the free-wheeling diode and receiving, at least in the starting period of the controlling operation, an ignition pulse in synchronism with an ignition pulse applied to the main thyristor, and the resistance value of said resistor being so selected that the current flowing from the d.c. power source to the resistor and the second thyristor and passing through the main thyristor is greater than the latching current value of the main thyristor.

2. A control device including a thyristor chopper for controlling an inductive load consisting of a d.c. motor, comprising a chopper including a main thyristor and means for extingushing the main thyristor and connected in parallel with said d.c. motor and also to a d.c. power source, a normal current blocking diode connected in series with said d.c. power source, and an auxiliary circuit comprising a resistor and a second thyristor connected in series and further connected in parallel with said normal current blocking diode, said second thyristor having a polarity reverse to that of the normal current blocking diode and receiving, at least in the starting period of a regenerative mode of operation, an ignition pulse in synchronism with an ignition pulse applied to the main thyristor, and the resistance value of said resistor being so selected that the current flowing from the d.c. power source to the resistor through the main thyristor and the second thyristor is greater than the latching current value of the main thyristor.

3. A control device including a thyristor chopper for controlling an inductive load consisting of a d.c. motor, comprising:

a load circuit consisting of a d.c. motor having an armature and a series connected field winding and switching means for switching the polarity of the armature;

a chopper comprising a main thyristor and means for extinguishing the main thyristor and connected between one terminal of said load circuit and one terminal of a d.c. power source;

first switching means connected between the other terminal of said load circuit and the other terminal of said d.c. power source, said switching means being closed during normal operation of the d.c. motor and opened during regenerative braking operation of the same motor;

second switching means connected parallelly with said series connected load circuit and chopper, said switching means being opened during normal operation of the d.c. motor and closed during regenerative braking operation of the same motor;

a diode of a polarity reverse to that of the d.c. power source connected in parallel with the series connected load circuit and the first switching means; and a second thyristor and a resistor connected in series and further connected in parallel with said diode, the polarity of said second thyristor being reverse to that of the diode, said second thyristor receiving, at least in the starting period of the normal operation and the regenerative braking operation, an ignition pulse synchronized with an ignition pulse applied to the main thyristor, and the resistance value of said resistor being so selected that the current flowing from the d.c. power source to the resistor through the main thyristor and the second thyristor is greater than the latching current value of the main thyristor.

* * * * *